United States Patent
Hourunranta et al.

(10) Patent No.: US 12,015,805 B2
(45) Date of Patent: Jun. 18, 2024

(54) METHOD, AN APPARATUS AND A COMPUTER PROGRAM PRODUCT FOR VIDEO STREAMING

(71) Applicant: Nokia Technologies Oy, Espoo (FI)

(72) Inventors: Ari Hourunranta, Tampere (FI); Miska Matias Hannuksela, Tampere (FI); Emre Baris Aksu, Tampere (FI); Saba Ahsan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/795,631

(22) PCT Filed: Jan. 21, 2021

(86) PCT No.: PCT/EP2021/051229
§ 371 (c)(1),
(2) Date: Jul. 27, 2022

(87) PCT Pub. No.: WO2021/151761
PCT Pub. Date: Aug. 5, 2021

(65) Prior Publication Data
US 2023/0072093 A1    Mar. 9, 2023

Related U.S. Application Data

(60) Provisional application No. 62/967,202, filed on Jan. 29, 2020.

(51) Int. Cl.
*H04N 21/218* (2011.01)
*H04N 21/472* (2011.01)
*H04N 21/81* (2011.01)

(52) U.S. Cl.
CPC ..... *H04N 21/21805* (2013.01); *H04N 21/472* (2013.01); *H04N 21/816* (2013.01)

(58) Field of Classification Search
None
See application file for complete search history.

(56) References Cited

U.S. PATENT DOCUMENTS

| 2018/0190327 A1* | 7/2018 | Coward | H04N 21/816 |
| 2018/0288363 A1* | 10/2018 | Amengual Galdon | H04N 19/40 |

(Continued)

FOREIGN PATENT DOCUMENTS

| CN | 107888993 A | 4/2018 |
| CN | 108886639 A | 11/2018 |
| CN | 109218734 A | 1/2019 |

OTHER PUBLICATIONS

Ghaznavi-Youvalari, Ramin et al., "Viewport-Dependent Delivery Schemes for Stereoscopic Panoramic Video", 2017 3DTV Conference: The True Vision—Capture, Transmission and Display of 3D Video, IEEE 2017, Jun. 7, 2017, pp. 1-4.

(Continued)

*Primary Examiner* — Jason K Lin
(74) *Attorney, Agent, or Firm* — Harrington & Smith

(57) ABSTRACT

The embodiments relate to a method including determining a foreground area covering a viewport of 360-degree video and one or more other areas of 360-degree video, not containing the foreground area in its entirety; concluding a first set of tile streams among available tile streams of the 360-degree video to cover the foreground area; concluding a second set of tile streams among the available tile streams of the 360-degree video, to cover the one or more other areas; and requesting transmission of a first set of portions of the first set of tile streams and a second set of portions of the second set of tile streams, wherein the portions in the first set of portions have a shorter duration that portions in the second set of portions.

20 Claims, 6 Drawing Sheets

(56) References Cited

U.S. PATENT DOCUMENTS

2019/0158815 A1\* 5/2019 He .................. H04N 21/8456
2019/0230388 A1\* 7/2019 Di .................. H04N 21/2662
2021/0112236 A1\* 4/2021 Fleureau ............. H04N 13/194
2022/0103899 A1\* 3/2022 Taibs Guguen ... H04N 21/6547

OTHER PUBLICATIONS

Hannuksela, Miska M. et al., "How OMAF v1 supports MPEG-I Phase 1b requirements", Nokia, Fraunhofer HHI, International Organisation for Standardisation, Coding of Moving Pictures and Audio, Apr. 2018, San Diego, CA.

\* cited by examiner

METHOD, AN APPARATUS AND A COMPUTER PROGRAM PRODUCT FOR VIDEO STREAMING

CROSS REFERENCE TO RELATED APPLICATION

This patent application is a U.S. National Stage application of International Patent Application Number PCT/EP2021/051229 filed Jan. 21, 2021, which is hereby incorporated by reference in its entirety, and claims priority to U.S. 62/967,202 filed Jan. 29, 2020, which is hereby incorporated by reference in its entirety.

TECHNICAL FIELD

The present solution generally relates to streaming media content, especially video.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted being prior art by inclusion in this section.

Devices that are able to capture image and video have evolved from devices capturing a limited angular field of view to devices capturing 360-degree content. These devices are able to capture visual and audio content all around them, i.e. they can capture the whole angular field of view, which may be referred to as 360 degrees field of view. More precisely, the devices can capture a spherical field of view (i.e., 360 degrees in all spatial directions). In addition to the new types of image/video capturing devices, also new types of output technologies have been invented and produced, such as head-mounted displays. These devices allow a person to see visual content all around him/her, giving a feeling of being "immersed" into the scene captured by the 360 degrees camera. The new capture and display paradigm, where the field of view is spherical, is commonly referred to as virtual reality (VR) and is believed to be the common way people will experience media content in the future.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided a method comprising
  determining a foreground area covering a viewport of 360-degree video and one or more other areas of 360-degree video, not containing the foreground area in its entirety;
  concluding a first set of tile streams among available tile streams of the 360-degree video, wherein the first set of tile streams covers the foreground area;
  concluding a second set of tile streams among the available tile streams of the 360-degree video, wherein the second set of tile streams covers the one or more other areas;
  requesting transmission of a first set of portions of the first set of tile streams and a second set of portions of the second set of tile streams, wherein portions in the first set of portions have a shorter duration than portions in the second set of portions.

According to an embodiment, the one or more other areas comprises a margin area and background area, and the method further comprises
  determining a margin area adjacent to the foreground area, and a background area covering 360-degree video not contained in the foreground or margin areas;
  concluding a first subset of the second set of tile streams, wherein the first set of tile streams covers the foreground area,
  concluding a second subset the tile streams to comprise the tile streams that are among the second set of tile streams and not among the first subset;
  requesting transmission of a first subset of portions of the first subset of tile streams and a second subset of portions of the second subset of tile streams, wherein portions in the first subset of portions have a shorter duration than portions in the second subset of portions.

According to an embodiment, the method further comprises requesting transmission of an extractor track or alike in portions that have a longer duration than that for the first set of portions.

According to an embodiment, the method further comprises obtaining, from a media presentation description and/or stream initialization data and/or stream index data, metadata on areas covered by tile streams; and concluding the first set of tile streams and the second set of tile streams based on the metadata.

According to a second aspect, there is provided an apparatus comprising apparatus comprising at least one processor, memory including computer program code, the memory and the computer program code configured to, with the at least one processor, cause the apparatus to perform at least the following:
  determine a foreground area covering a viewport of 360-degree video and one or more other areas of 360-degree video, not containing the foreground area in its entirety;
  conclude a first set of tile streams among available tile streams of the 360-degree video, wherein the first set of tile streams covers the foreground area;
  conclude a second set of tile streams among the available tile streams of the 360-degree video, wherein the second set of tile streams covers the one or more other areas;
  request transmission of a first set of portions of the first set of tile streams and a second set of portions of the second set of tile streams, wherein portions in the first set of portions have a shorter duration than portions in the second set of portions.

According to an embodiment, the one or more other areas comprises a margin area and background area, and the apparatus further comprises computer program code to cause the apparatus to determine a margin area adjacent to the foreground area, and a background area covering 360-degree video not contained in the foreground or margin areas;

conclude a first subset of the second set of tile streams, wherein the first set of tile streams covers the foreground area, conclude a second subset the tile streams to comprise the tile streams that are among the second set of tile streams and not among the first subset;

request transmission of a first subset of portions of the first subset of tile streams and a second subset of portions of the second subset of tile streams, wherein portions in the first subset of portions have a shorter duration than portions in the second subset of portions.

According to an embodiment, the apparatus further comprises computer program code configured to cause the apparatus to request transmission of an extractor track or alike in portions that have a longer duration than that for the first set of portions.

According to an embodiment, the apparatus further comprises computer program code configured to cause the apparatus to obtain, from a media presentation description and/or stream initialization data and/or stream index data, metadata on areas covered by tile streams;

conclude the first set of tile streams and the second set of tile streams based on the metadata.

According to a third aspect, there is provided a computer program product comprising computer program code configured to, when executed on at least one processor, cause an apparatus or a system to:

determine a foreground area covering a viewport of 360-degree video and one or more other areas of 360-degree video, not containing the foreground area in its entirety;

conclude a first set of tile streams among available tile streams of the 360-degree video, wherein the first set of tile streams covers the foreground area;

conclude a second set of tile streams among the available tile streams of the 360-degree video, wherein the second set of tile streams covers the one or more other areas;

request transmission of a first set of portions of the first set of tile streams and a second set of portions of the second set of tile streams, wherein portions in the first set of portions have a shorter duration than portions in the second set of portions.

DESCRIPTION OF THE DRAWINGS

In the following, various embodiments will be described in more detail with reference to the appended drawings, in which.

DESCRIPTION OF EXAMPLE EMBODIMENTS

Figure 1:
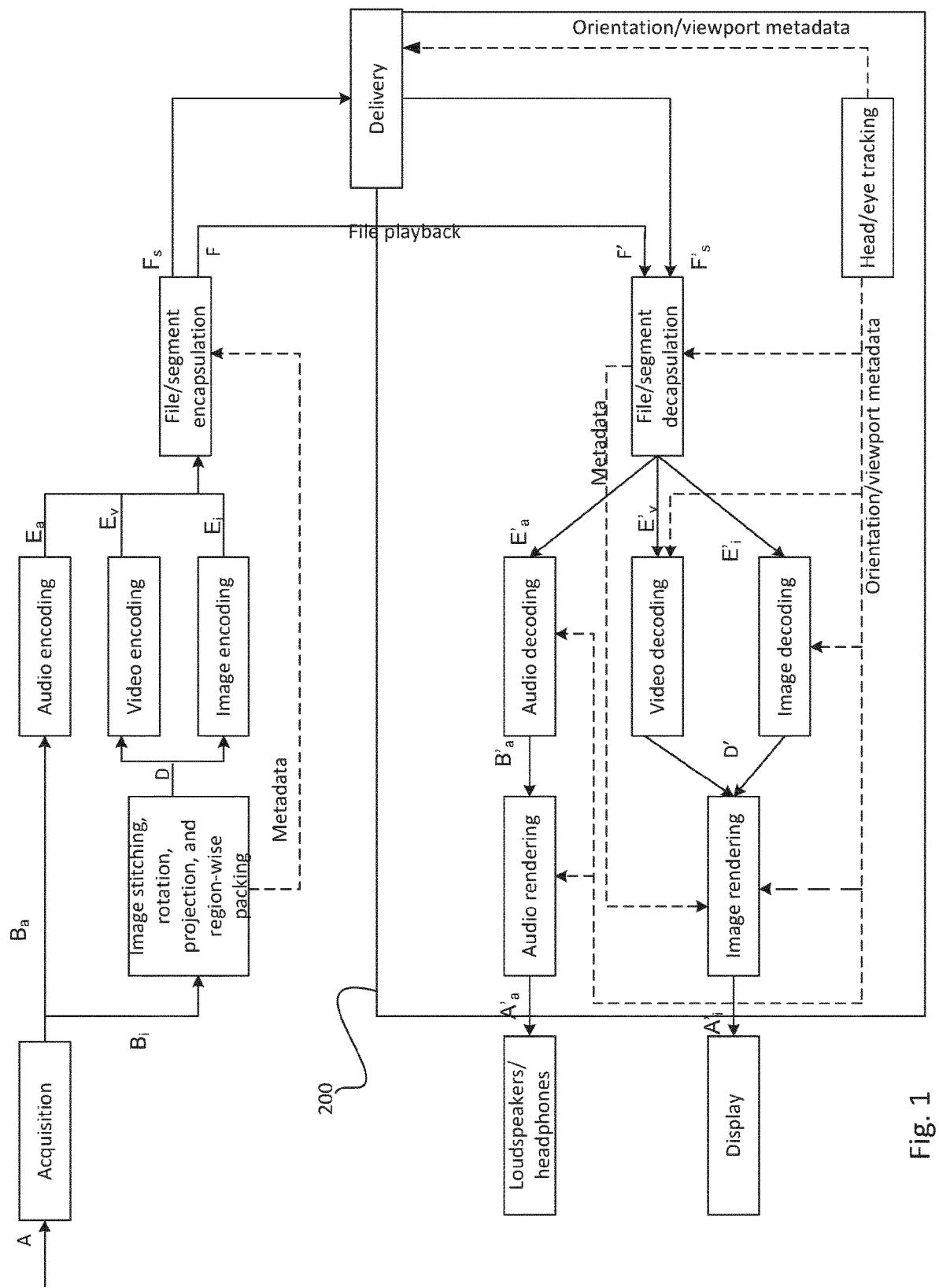
FIG. 1 shows an example of the OMAF system architecture.

Since the beginning of photography and cinematography, the most common type of image and video content has been captured by cameras with relatively narrow field of view and displayed as a rectangular scene on flat displays. Such content is referred as "flat content", or "flat image", or "flat video" in this application. The cameras are mainly directional, whereby they capture only a limited angular field of view (the field of view towards which they are directed). Such a flat video is output by a display device capable of displaying two-dimensional content.

More recently, new image and video capture devices have become available. These devices are able to capture visual and audio content all around them, i.e. they can capture the whole angular field of view, sometimes referred to as 360 degrees field of view. More precisely, they can capture a spherical field of view (i.e., 360 degrees in all spatial directions). Furthermore, new types of output such as head-mounted displays, and other devices, allow a person to see the 360-degree visual content.

360-degree video or virtual reality (VR) video generally refer to video content that provides such a large field of view (FOV) that only a part of the video is displayed at a single point of time in typical displaying arrangements. For example, VR video may be viewed on a head-mounted display (HMD) that may be capable of displaying e.g. about a 100-degree field of view. The spatial subset of the VR video content to be displayed may be selected based on the orientation of the HMD. In another example, a typical flat-panel viewing environment is assumed, wherein e.g. up to a 40-degree field-of-view may be displayed. When displaying wide-FOV content (e.g., fisheye) on such a display, a spatial subset may be displayed rather than the entire picture.

Available media file format standards include International Standards Organization (ISO) base media file format (ISO/IEC 14496-12, which may be abbreviated ISOBMFF), Moving Picture Experts Group (MPEG)-4 file format (ISO/IEC 14496-14, also known as the MP4 format), file format for NAL (Network Abstraction Layer) unit structured video (ISO/IEC 14496-15) and High Efficiency Video Coding standard (HEVC or H.265/HEVC).

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

High Efficiency Image File Format (HEIF) is a standard developed by the Moving Picture Experts Group (MPEG) for storage of images and image sequences. Among other things, the standard facilitates file encapsulation of data coded according to High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the following, term "omnidirectional" may refer to media content that may have greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360-degree view in the horizontal direction and/or 180-degree view in the vertical direction.

A panoramic image covering a 360-degree field-of-view horizontally and a 180-degree field-of-view vertically can be represented by a sphere that has been mapped to a two-dimensional image plane using the equirectangular projection (ERP). In this case, the horizontal coordinate may be considered equivalent to a longitude, and the vertical coordinate may be considered equivalent to a latitude, with no transformation or scaling applied. In some cases, panoramic content with a 360-degree horizontal field-of-view, but with less than a 180-degree vertical field-of-view may be considered special cases of equirectangular projection, where the polar areas of the sphere have not been mapped onto the two-dimensional image plane. In some cases, panoramic content may have less than a 360-degree horizontal field-of-view and up to a 180-degree vertical field-of-view, while otherwise having the characteristics of an equirectangular projection format.

Immersive multimedia, such as omnidirectional content consumption is more complex for the end user compared to the consumption of 2D content. This is due to the higher degree of freedom available to the end user. The freedom also results in more uncertainty. The MPEG Omnidirectional Media Format (OMAF) v1 standardized the omnidirectional streaming of single 3DoF (3 Degrees of Freedom) content (where the viewer is located at the centre of a unit sphere and has three degrees of freedom (Yaw-Pitch-Roll). At the time of writing this specification, OMAF version 2 is close to completion. Among other things, OMAF v2 includes means to optimize the Viewport Dependent Streaming (VDS) operations and bandwidth management.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV).

In the context of viewport-dependent 360-degree video streaming, the term tile may refer to an isolated region, which may be defined to depend only on the collocated isolated region in reference pictures and does not depend on any other picture regions in the current picture or in the reference pictures. Sometimes the term tile or the term tile sequence may refer to a sequence of collocated isolated regions. It is remarked that video codecs may use the term tile as a spatial picture partitioning unit, which might not have the same constraints or properties as an isolated region.

An example how a tile in the context of viewport-dependent 360-degree video streaming can be obtained with the High Efficiency Video Coding (HEVC) standard is called a motion-constrained tile set (MCTS). An MCTS is such that the inter prediction process is constrained in encoding such that no sample value outside the MCTS, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the temporal motion vector prediction (TMVP) candidate or any motion vector prediction candidate following the TMVP candidate in a motion vector candidate list for prediction units located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

Another example how a tile in the context of viewport-dependent 360-degree video streaming can be obtained with the Versatile Video Coding (VVC) standard is described next. A draft VVC standard supports subpictures (a.k.a. sub-pictures). A subpicture may be defined as a rectangular region of one or more slices within a picture, wherein the one or more slices are complete. Consequently, a subpicture consists of one or more slices that collectively cover a rectangular region of a picture. The slices of a subpicture may be required to be rectangular slices. Partitioning of a picture to subpictures (a.k.a. a subpicture layout or a layout of subpictures) may be indicated in and/or decoded from an SPS. One or more of the following properties may be indicated (e.g. by an encoder) or decoded (e.g. by a decoder) or inferred (e.g. by an encoder and/or a decoder) for the subpictures collectively or per each subpicture individually: i) whether or not a subpicture is treated as a picture in the decoding process; in some cases, this property excludes in-loop filtering operations, which may be separately indicated/decoded/inferred; ii) whether or not in-loop filtering operations are performed across the subpicture boundaries. Treating a subpicture as a picture in a decoding process may comprise saturating the sample locations in inter prediction that would otherwise be outside the subpicture onto the subpicture boundary. When the boundaries of a subpicture are treated like picture boundaries, and sometimes also when loop filtering is turned off across subpicture boundaries, the subpicture may be regarded as a tile in the context of viewport-dependent 360° video streaming.

When streaming VR video, a subset of 360-degree video content covering the viewport (i.e., the current view orientation) may be transmitted at the best quality/resolution, while the remaining of 360-degree video may be transmitted at a lower quality/resolution. This is what characterizes a VDS system, as opposed to a Viewport Independent Streaming system, where the omnidirectional video is streamed at same quality in all directions.

FIG. 1 illustrates the OMAF system architecture. The system can be situated in a video camera, or in a network server, for example. As shown in FIG. 1, an omnidirectional media (A) is acquired. If the OMAF system is part of the video source, the omnidirectional media (A) is acquired from the camera means. If the OMAF system is in a network server, the omnidirectional media (A) is acquired from a video source over the network.

The omnidirectional media comprises image data ($B_i$) and audio data ($B_a$), which are processed separately. In image stitching, rotation, projection and region-wise packing, the images/video of the source media are provided as input ($B_i$) and stitched to generate a sphere picture on a unit sphere per the global coordinate axes. The unit sphere is then rotated relative to the global coordinate axes. The amount of rotation to convert from the local coordinate axes to the global coordinate axes may be specified by the rotation angles indicated in a RotationBox. The local coordinate axes of the unit sphere are the axes of the coordinate system that has been rotated. The absence of the RotationBox indicates that the local coordinate axes are the same as the global coordinate axes. Then, the spherical picture on the rotated unit sphere is converted to a two-dimensional projected picture, for example using the equirectangular projection. When spatial packing of stereoscopic content is applied, two spherical pictures for the two views are converted to two constituent pictures, after which frame packing is applied to pack the two constituent picture on one projected picture. Rectangular region-wise packing can then be applied to obtain a packed picture from the projected picture. The packed pictures (D) are then provided for video and image encoding to result in encoded image ($E_i$) and/or encoded video stream ($E_v$). The audio of the source media is provided as input ($B_a$) to audio encoding that provides as an output, the encoded audio ($E_a$). The encoded data ($E_i$, $E_v$, $E_a$) are then encapsulated into file for playback (F) and delivery (i.e. streaming) ($F_s$).

In the OMAF player 200, such as in an HMD, a file decapsulator processes the files (F', F'$_s$) and extracts the coded bitstreams (E'$_i$, E'$_v$, E'$_a$) and parses the metadata. The audio, video and/or images are then decoded into decoded data (D', B'$_a$). The decoded pictures (D') are projected onto a display according to the viewport and orientation sensed by a head/eye tracking device. Similarly, the decoded audio (B'$_a$) is rendered through loudspeakers/headphones.

A basic building block in the ISO base media file format is called a box. Each box has a header and a payload. The box header indicates the type of the box and the size of the box in terms of bytes. Box type may be identified by an unsigned 32-bit integer, interpreted as a four-character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above can be realized.

In some examples, the media samples for the movie fragments may reside in an 'mdat' box. For the metadata of the movie fragments, however, a 'moof' box may be provided. The 'moof' box may include the information for a certain duration of playback time that would previously have been in the 'moov' box. The 'moov' box may still represent a valid movie on its own, but in addition, it may include an 'mvex' box indicating that movie fragments will follow in the same file. The movie fragments may extend the presentation that is associated to the 'moov' box in time.

Within the movie fragment there may be a set of track fragments, including anywhere from zero to a plurality per track. The track fragments may in turn include anywhere from zero to a plurality of track runs, each of which is a contiguous run of samples for that track (and hence are similar to chunks). Within these structures, many fields are optional and can be defaulted. The metadata that may be included in the 'moof' box may be limited to a subset of the metadata that may be included in a 'moov' box and may be coded differently in some cases. Details regarding the boxes that can be included in a 'moof' box may be found from the ISOBMFF specification. A self-contained movie fragment may be defined to consist of a 'moof' box and an 'mdat' box that are consecutive in the file order and where the mdat box contains the samples of the movie fragment (for which the 'moof' box provides the metadata) and does not contain samples of any other movie fragment (i.e. any other 'moof' box).

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derive from generic classes (e.g. VisualSampleEntry, AudioSampleEntry). The type of sample entry form that is used for derivation of the track-type specific sample entry format is determined by the media handler of the track.

Extractor tracks are specified in the ISOBMFF encapsulation format of HEVC and AVC (Advanced Video Coding) bitstreams (ISO/IEC 14496-15). Samples in an extractor track contain instructions to reconstruct a valid HEVC or AVC bitstream by including rewritten parameter set and slice header information and referencing to byte ranges of coded video data in other tracks. Consequently, a player only needs to follow the instructions of an extractor track to obtain a decodable bitstream from tracks containing MCTSs.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. An URN may be defined as a URI that identifies a resource by name in a particular namespace. An URN may be used for identifying a resource without implying its location or how to access it.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). MPEG DASH and 3GP-DASH are technically close to each other and may therefore be collectively referred to as DASH.

Some concepts, structures, and specifications of DASH are described below as an example of a container file format, based on which the embodiments may be implemented. The aspects of the invention are not limited to DASH, but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof that may differ by the encoding choice, e.g. by bitrate, resolution, language, codec, etc. The Segment contains certain duration of media data, and metadata to decode and present the included media content. A Segment is identified by a URI and may be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements may be structured in the same way, namely they contain a @schemeIdUri attribute that provides a URI to identify the scheme and an optional attribute @value and an optional attribute @id. The semantics of the element are specific to the scheme employed. The URI identifying the scheme may be an URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required, then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is an URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by an MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration may be a lower bound on the end-to-end latency perceived by a DASH client since a Segment is a discrete unit of generating media data for DASH. Content generation may be done such a manner that a whole Segment of media data is made available for a server. Furthermore, many client implementations use a Segment as the unit for GET requests. Thus, in arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate.

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used and Sub-Representations are described in the MPD, the following applies:
 a) The Initialization Segment contains the Level Assignment box.
 b) The Subsegment Index box ('ssix') is present for each Subsegment.
 c) The attribute @level specifies the level to which the described Sub-Representation is associated to in the Subsegment Index. The information in Representation, Sub-Representation and in the Level Assignment ('leva') box contains information on the assignment of media data to levels.
 d) Media data should have an order such that each level provides an enhancement compared to the lower levels.

If the @level attribute is absent, then the SubRepresentation element is solely used to provide a more detailed description for media streams that are embedded in the Representation.

Conventionally, DASH can be used in two operation modes, namely live and on-demand. For both operation modes the DASH standard provides profiles that specify constraints on the MPD and segment formats. In the live profiles, the MPD contains sufficient information for requesting Media Segments, and the client can adapt the streaming bitrate by selecting the Representations from which the Media Segments are received. In the on-demand profiles, in addition to the information in the MPD, the client typically obtains a segment index from each Media Segment of each Representation. Many times, there is only a single Media Segment for the entire Representation. The segment index comprises SegmentIndexBoxes ('sidx'), which describe Subsegments included in the Media Segment. The client selects the Representation(s) from which Subsegments are fetched and requests them using byte range requests.

A sphere region may be defined as region on a sphere. A type may be indicated or inferred for a sphere region. A first sphere region type may be specified by four great circles, where a great circle may be defined as the intersection of the sphere and a plane that passes through the centre point of the sphere. A second sphere region type by two azimuth circles and two elevation circles, where an azimuth circle may be defined as a circle on the sphere connecting all points with the same azimuth value and an elevation circle may be defined as a circle on the sphere connecting all points with the same elevation value. A first and/or second sphere region types may additionally cover a defined type of a region on the rotated sphere after applying certain amount of yaw, pitch, and roll rotations.

Region-wise quality ranking metadata may be present in or along a video or image bitstream. Quality ranking values of quality ranking regions may be relative to other quality ranking regions of the same bitstream or the same track or quality ranking regions of other tracks. Region-wise quality ranking metadata can be indicated for example by using the SphereRegionQualityRankingBox or the 2DRegionQualityRankingBox, which are specified as a part of MPEG Omnidirectional Media Format. SphereRegionQualityRankingBox provides quality ranking values for sphere regions, i.e., regions defined on sphere domain, while 2DRegionQualityRankingBox provides quality ranking values for rectangular regions on decoded pictures (and potentially a leftover region covering all areas not covered by any of the rectangular regions). Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region may be defined to be approximately constant. In general, the boundaries of the quality ranking sphere or 2D regions may or may not match with the boundaries of the packed regions or the boundaries of the projected regions specified in region-wise packing metadata. DASH MPD or other streaming manifests may include region-wise quality ranking signaling. For example, OMAF specifies the spherical region-wise quality ranking (SRQR) and the 2D region-wise quality ranking (2DQR) descriptor for carrying quality ranking metadata for sphere regions and for 2D regions on decoded pictures, respectively.

Content coverage may be defined as one or more sphere regions that are covered by the content represented by the track or an image item. Content coverage metadata may be present in or along a video or image bitstream, e.g. in a CoverageInformationBox specified in OMAF. Content coverage may be indicated to apply for monoscopic content, either view of stereoscopic content (as indicated), or both views of stereoscopic content. When indicated for both views, the content coverage of left view might or might not match with the content coverage of the right view. DASH MPD or other streaming manifests may include content coverage signaling. For example, OMAF specifies the content coverage (CC) descriptor carrying content coverage metadata.

A recent trend in streaming in order to reduce the streaming bitrate of VR video is the following: a subset of 360-degree video content covering the primary viewport (i.e., the current view orientation) is transmitted at the best quality/resolution, while the remaining of 360-degree video is transmitted at a lower quality/resolution. There are generally two approaches for viewport-adaptive streaming: a viewport-specific encoding and streaming; and VR viewport video.

Figures 2, 3:
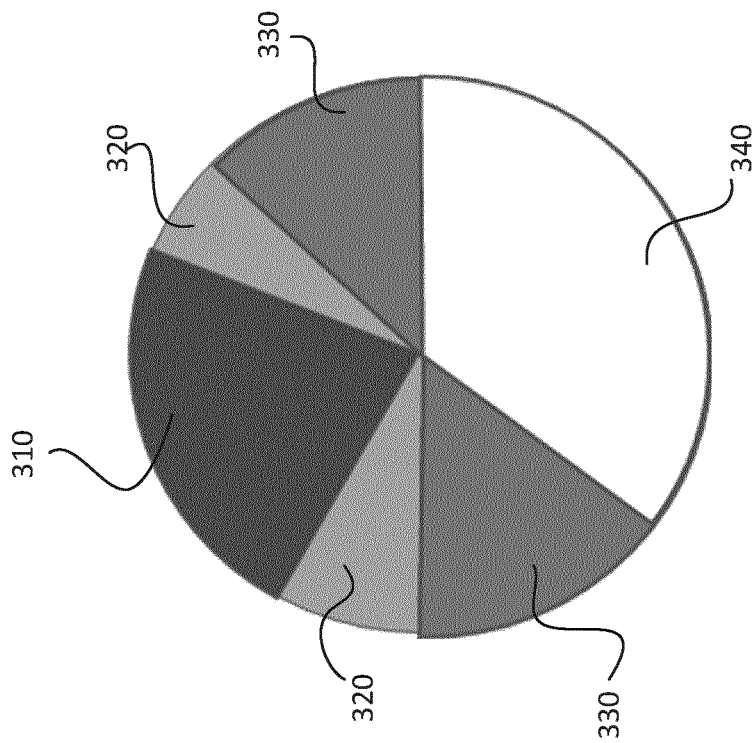
FIG. 2 shows an example of a packing 360-degree content into the same frame.
FIG. 3 shows an example of a 360-degree sphere from top.

The viewport-specific encoding and streaming is also known as viewport-dependent encoding and streaming, or as asymmetric protection, or as packed VR video. In such approach, 360-degree image content is packed into the same frame with an emphasis (e.g. greater spatial area) on the primary viewport. The packed VR frames are encoded into a single bitstream. For example, in cubemap projection format (a.k.a. cube map), spherical video is projected onto the six faces (a.k.a. sides) of a cube. The cubemap may be generated e.g. by first rendering the spherical scene six times from a viewpoint, with the views defined by a 90-degree view frustum representing each cube face. The cube sides may be frame-packed into the same frame or each cube side may be treated individually (e.g. in encoding). There are many possible orders of locating cube sides onto a frame and/or cube sides may be rotated or mirrored. In cubemap projection format the front face of a cube map may be sampled with a higher resolution compared to other cube faces, and the cube faces may be mapped to the same packed VR frame as shown in FIG. 2.

The VR viewport video is also known as tile-based encoding and streaming. In such approach, 360-degree content is encoded and made available in a manner that enables selective streaming of viewports from different encodings. Projected pictures are encoded as several tiles. Several versions of the content are encoded at different bitrates and/or resolutions. Coded tile sequences are made available for streaming together with metadata describing the location of the tile on the omnidirectional video. Clients select which tiles are received so that the viewport is covered at higher quality and/or resolution than the other tiles. For example, each cube face may be separately encoded and encapsulated in its own track (and Representation). More than one encoded bitstream for each cube face may be provided, e.g. each with different spatial resolution. Players can choose tracks (or Representations) to be decoded and played based on the current viewing orientation. High-resolution tracks (or Representations) may be selected for the cube faces used for rendering for the present viewing orientation, while the remaining cube faces may be obtained from their low-resolution tracks (or Representations). In another example, equirectangular panorama content is encoded using tiles. More than one encoded bitstream may be provided, e.g. with different spatial resolution and/or picture quality. Each tile sequence is made available in its own track (and Representation). Players can choose tracks (or Representations) to be decoded and played based on the current viewing orientation. High-resolution or high-quality tracks (or Representations) may be selected for tiles covering the present primary viewport, while the remaining area of the 360-degree content may be obtained from low-resolution or low-quality tracks (or Representations).

While the VR viewport video, discussed above, is more flexible as it enables mixing tiles and taking in higher quality tiles when needed and possibly using already cached tiles as low quality tiles, rather than switching the whole 360-degree video representation when viewport changes, it also introduces overhead since the tiles are being transmitted as separate streams over transport layer.

Further, to optimize motion-to-high quality latency, the tile segments of video need to be relative short, preferably less than 1 second. This means that the transmission layer packets are short, and hence the rate of packets gets high. Together with the high number of parallel download streams, this results in a high number of network transmission packet rate; in MPEG-DASH high rate of HTTP requests.

The present embodiments focus on the transmission of the tiles in the scheme like in VR viewport video (i.e. tile-based encoding and streaming).

Viewport dependency can be achieved by having at least two quality areas: foreground (content in the current viewport) and background (i.e. content outside the current viewport in 360-degree video). Instead of two categories, the quality areas may comprise a third category: a margin around the viewport. It needs to be understood that embodiments are not limited to two or three categories of quality areas but apply generally to any number of categories of quality areas. FIG. 3 illustrates a 360-degree sphere from top. Area 310 represents the current viewport (with areas 320 representing the margin due to viewport not matching with tile boundaries). Area 330 represents margins that may have lower quality than the viewport. Area 340 represents the background area, i.e. content outside the current viewport, with further lower video quality, hence occupying the least bandwidth.

From transmission system point-of-view, tile-based delivery of 360-degree video content may become challenging due to the combination of large number of tiles and short tile segments which together result in high rate of HTTP requests. For example, if 360-degree video is divided into 16 tiles, tile segment duration is 500 msec or even less, the number of tile segments to download is 16/0.5 sec=32 HTTP requests/sec for video only. Further, the rate is higher when a user is moving his/her head, since that triggers high quality tile requests for the new viewport. This can cause throughput issues in clients HTTP/TCP/WiFi stacks and/or networks. Also, in DASH live profile streams, content delivery networks (CDN) need to handle even millions of very short segments (both from time and also byte-size perspective). Since the problem pertains to the number of requests, it cannot be solved with an adaptive bitrate (ABR) scheme. Further, there may be additionally other tracks, such as extractor tracks and audio track(s), which increase the HTTP traffic even more.

The HTTP traffic is less an issue with traditional, non-tiled video streaming, as only a few streams are downloaded in parallel. Further, non-360-degree live video broadcasts may use 2-3 seconds long segments. Such a segment duration is a compromise between added latency to live broadcast and load on CDN (traffic from clients to CDN and from CDN towards content origin, and storage of small segments).

For on-demand non-360-degree streaming, on the other hand, the clients select the downloaded subsegment sizes, not necessarily following possible subsegment boundaries on file format level. However, clients supporting cases where stream representations may need to be switched, such as adaptive bitrate, need to utilize subsegments to enable switching between representations.

HTTP/2 can multiplex HTTP requests and responses, hence reducing the number of required TCP connections. However, in practice HTTP/2 seems to be widely supported only with HTTPS, which may not be optimal for all media streaming use cases e.g. since HTTPS encrypts the transmitted streams specifically for each client and consequently the streams cannot be cached in intermediate network elements to serve multiple clients.

The present embodiments focus on using different (sub) segment sizes (in terms of duration) for different streams, instead of fixed sizes for all streams.

According to an embodiment, a player device
determines a foreground area covering a viewport of 360-degree video and one or more other areas of 360-degree video, not containing the foreground area in its entirety;
concludes a first set of tile streams among available tile streams of the 360-degree video, wherein the first set of tile streams covers the foreground area;
concludes a second set of tile streams among the available tile streams of the 360-degree video, wherein the second set of tile streams covers the one or more other areas;
requests transmission of a first set of portions of the first set of tile streams and a second set of portions of the second set of tile streams, wherein portions in the first set of portions have a shorter duration than portions in the second set of portions.

In an embodiment, a portion is a subsegment as specified in DASH.

In an embodiment, a portion is a segment as specified in DASH.

In an embodiment, a stream is a Representation as specified in DASH.

Short (sub)segments sizes (in terms of duration) may enable fast viewport switch when user turns his head. The same can be achieved with long transport-level segments having several random-access points inside the segments. However, that may result in wasted bandwidth, if only part of the downloaded segment is used for active viewport.

The viewport consumes most of the bandwidth and hence short (sub)segment size should be used in content creation to avoid waste in the case the viewport changes within the downloading and/or playback of the (sub)segment that contained the viewport before the viewport change. In addition, player devices should fetch only such (sub)segments that are really needed.

The background area (content outside the current viewport) of a 360-degree video may occupy significantly less bandwidth than foreground area (viewport). Therefore, bandwidth waste in a situation where some (sub)segments are replaced with higher quality (sub)segments due to viewport change, is minor.

If there is a margin area, the margin area may have (sub)segment sizes between background (sub)segment sizes and foreground (viewport) (sub)segment sizes.

In an embodiment, the one or more other areas comprises a margin area and background area, and a player device
determines a margin area adjacent to the foreground area, and a background area covering 360-degree video not contained in the foreground or margin areas;
concludes a first subset of the second set of tile streams, wherein the first set of tile streams covers the foreground area,
concludes a second subset the tile streams to comprise the tile streams that are among the second set of tile streams and not among the first subset;
requests transmission of a first subset of portions of the first subset of tile streams and a second subset of portions of the second subset of tile streams, wherein portions in the first subset of portions have a shorter duration than portions in the second subset of portions.

The extractor track, if present, may also use very little bandwidth and hence using a long segment size is not an issue. The same applies to audio, and to other tracks that don't affect the user experience when viewport switch takes place.

In an embodiment, a player device requests transmission of an extractor track or alike in portions that have a longer duration than that for the first set of portions.

Latency increase when receiving longer background (sub) segments should not be significant, since the background (sub)segments have lower bitrate and are downloaded faster than foreground (sub)segments.

A more detailed description in the context of OMAF is given in the following.

OMAF comprises two main types for tile-based viewport dependent operation:
Region-wise mixed quality (RWMQ): Several versions of the content are coded with the same tiling, each with different bitrate and/or picture quality. The resolution of all the versions is the same, and typically the tile sizes are identical regardless of their location within the picture. Players choose high-quality tiles to cover the viewport and low-quality tiles covering the remaining parts of the sphere.
Region-wise mixed resolution (RWMR): Tiles are encoded at multiple resolutions. Player devices select a combination of high-resolution tiles covering the viewport and low-resolution tiles for the remaining areas.

The RWMQ may comprise e.g. 6×4 tiling grid, hence resulting 24 tile tracks to be downloaded in parallel together with one extractor, audio, and possible other tracks. With short segment sizes (e.g. 300 msec), this can result in close to 100 HTTP requests per second or even more.

There are a few options for implementing the RWMR scheme, but the number of tile tracks is comparable to the presented RWMQ case.

If each tile was decoded with a dedicated decoder in the player device, the tile segments need not to be aligned. However, that may not be a practical setup, and therefore OMAF specifies mechanisms to merge the segment bitstreams and to decode the whole picture with a single decoder. This, however, requires that the tile segments are aligned, i.e. the frame types of each frame are aligned.

Figure 4:
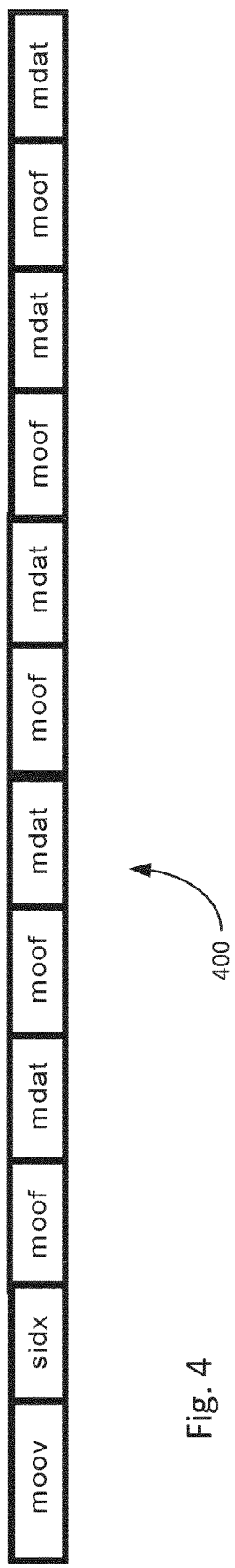
FIG. 4 shows an example of a video tile track being placed into one bitrate.

DASH On-Demand Profile:

In DASH on-demand-profile based on ISOBMFF, the whole video tile track in one bitrate may be placed in a single file as a single segment and is accessible via a single URL. FIG. 4 shows an example of a file 400 that comprises a movie header box ('moov'), a segment index box ('sidx'), and a sequence of movie fragments ('moof'+'mdat'). The 'sidx' defines offsets of each 'moof' box from the origin of the file.

At first the player device downloads segment index table ('sidx') that indicates subsegment locations in the file. After that the player device fetches the subsegments in the file with HTTP byte range requests. The player device is able to decide how much data it wishes to download per request. The requested URL remains the same, only the byte ranges are different. Hence, the server need not be even aware of possible subsegment fetching optimizations, as long as it creates short subsegments that are suitable for fast viewport switching.

There is no requirement in any standards to follow the subsegment boundaries when downloading, but the improvement of the present embodiments relate to selecting the downloaded byte ranges based on the role of the video tile: background vs. foreground vs. margin.

According to an embodiment, for background tiles, the player device may fetch several subsegments per HTTP request, whereas for foreground tiles it fetches a smaller number of (sub)segments per HTTP request, such as only a single subsegment per HTTP request.

Figure 5:
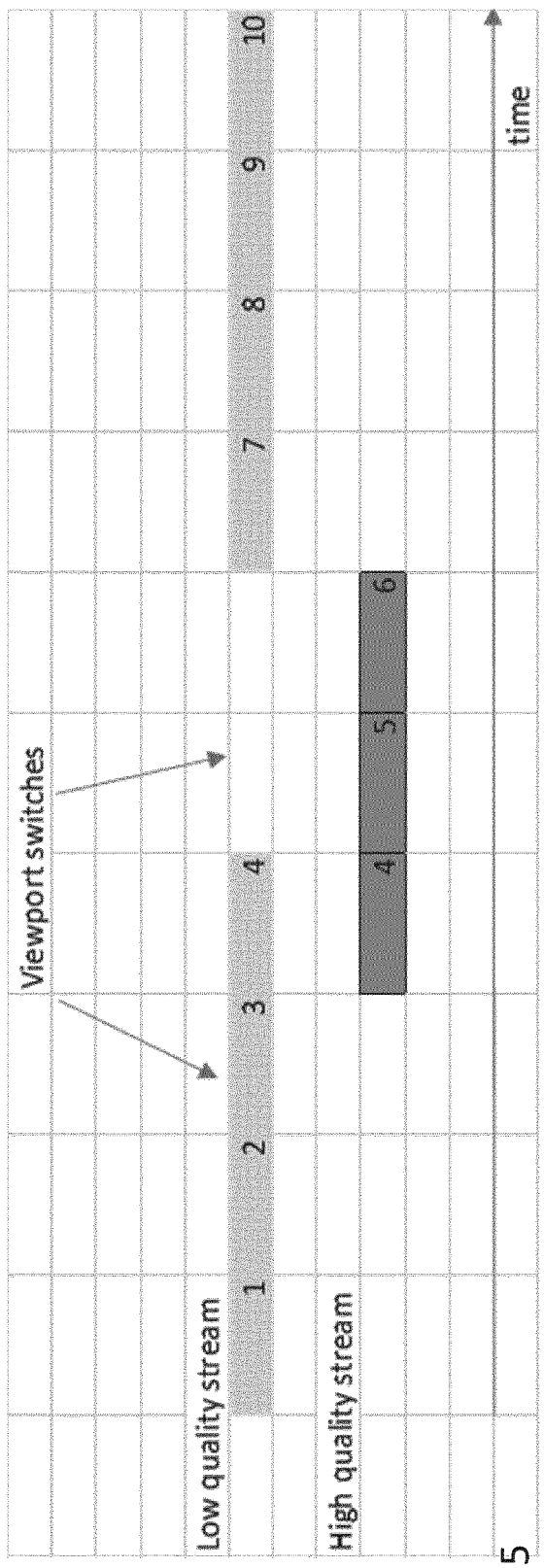
FIG. 5 shows a simplified illustration of switching between low- and high-quality streams in DASH on-demand profile.

FIG. 5 illustrates a subsegment switching between low- and high-quality streams. At first, the player device has downloaded 4 low quality subsegments as a combination. Viewport switch occurs during subsegment 3, so the player device quickly fetches high quality subsegment 4 and continues fetching high quality subsegments 5 and 6. The already downloaded low quality subsegment 4 is not needed any longer. When another viewport switch occurs at subsegment 5, the player device keeps on playing the already buffered high quality subsegments 5 and 6, and then switches to low quality, at the next subsegment boundary.

DASH Live-Profile:

In DASH Live-profile, each segment (comprising one or more ISOBMFF movie fragments) may have a unique URL. Hence, the player device cannot fetch many segments in a single HTTP request. Instead, for DASH Live-profile, some modifications to a process on how the DASH streams are generated are needed. This can be achieved by any of the following embodiments:

Migrating a non-360-degree video Live-deployment for 360-degree Viewport Dependent streaming could either
- use short DASH segments to keep viewport switch latency low but have high HTTP request traffic and CDN (Content Delivery Network) load.
- use long DASH segments to keep CDN load low but have significant viewport switch latency.

According to an embodiment, an optimized Live deployment for Viewport Dependent streaming (without any changes to existing standards) can instead be configured to generate long DASH segments that consist of sub-segments matching viewport switching latency targets. For example, 3 seconds long segments with 5-10 subsegments.

According to an embodiment, a player device is configured to
- obtain, from a media presentation description and/or stream initialization data and/or stream index data, available portions of tile streams;
- request transmission the first set of portions and the second set of portions based on the available portions.

According to an embodiment, a player device is configured to
- obtain, from a media presentation description and/or stream initialization data and/or stream index data, metadata on areas covered by tile streams.
- conclude the first set of tile streams and the second set of tile streams based on the metadata.

In an embodiment, the media presentation description conforms to DASH MPD.

In an embodiment, the stream initialization data conforms to an Initialization Segment specified in DASH and/or OMAF v2.

In an embodiment, the stream index data conforms to an Index Segment specified in DASH and/or OMAF v2.

According to an embodiment, a player device is configured to obtain metadata on the areas covered by tile streams as sphere regions from one or more of the following:
- sphere-region quality ranking box (SphereRegionQualityRankingBox)
- content coverage box (ContentCoverageBox)
- spherical region-wise quality ranking descriptor (SRQR descriptor)
- content coverage descriptor (CC descriptor)

According to an embodiment, a player device is configured to obtain metadata on the areas covered by tile streams as two-dimensional regions, such as rectangles, e.g. relative to a projected picture, from one or more of the following:
- 2D quality ranking box (2DRegionQualityRankingBox)
- 2D region-wise quality ranking (2DQR) descriptor
- spatial relationship descriptor (SRD descriptor) as specified in DASH In the following, several embodiments for the player device to achieve the presented operation is disclosed:

In a traditional solution, which is given only as a reference, a player device can download full segments for all tiles, also for foreground, and use them subsegment by subsegment. The subsegments enable switching within segments. This, however, requires additional bandwidth since the player needs to download additional full segments in high quality to provide low latency response to viewport switch.

According to a first embodiment, a player device is configured to fetch segment index first for each foreground tile segment, and then to fetch the foreground subsegments one by one as needed. Fetching segment index (i.e., the 'sidx' boxes) separately increases the rate of HTTP requests (since it causes an additional HTTP GET request per Segment of each DASH Representation). However, if segment duration is, for example, 3 seconds, and subsegments are ~300 msec long, there are 10 subsegments, resulting in max 11 HTTP requests per segment—unless there are lot of head motion, in which case the portion of segment index requests increases. When a switch occurs within a segment, the number of needed requests equals to the number of subsegments plus one.

The MPD may contain, in the @indexRange attribute, the byte range that contains the segment index. The player device may obtain the byte range for the segment index from the @indexRange attribute.

Further, the player device may estimate the size of the segment index and the first subsegment using, for example, the applicable value of @indexRange (if any) and the known properties of the tile bitstream, such as bitrate and segment duration, or segment sizes from other similar tile streams belonging to the same session, and combine them into one request, hence saving one HTTP request.

In the presented embodiment, the rate of HTTP requests is not higher compared to cases where all representations are fetched as short segments. This is because the lower request rate for non-critical streams compensates the rate of latency-critical and bandwidth-hungry foreground streams.

A second embodiment is based on new standardized technologies. OMAF version 2 introduces use of Index Segments, which were introduced to ISOBMFF and DASH specifications already earlier. Index segments provide access to segment indices as through Index Segment URL's that are separate from Media Segment URLs.

OMAF version 2 includes new segment formats, namely Initialization Segment for the Base Track, Tile Index Segment, and Tile Data Segment, which are described next. A Base Track may for example be an extractor track. The Initialization Segment for the Base Track contains the track header for the Base Track and all the referenced Tile Tracks. Thus, the client can only download the Initialization Segment for the Base Track and needs not download the Initialization Segments of the Tile Tracks.

In an embodiment, the Tile Index Segment is logically an Index Segment as specified in the DASH standard. It contains SegmentIndexBoxes for the Base Track and all the referenced Tile Tracks as well as MovieFragmentBoxes for the Base Track and all the referenced Tile Tracks. MovieFragmentBoxes indicate the byte ranges on a sample basis. Consequently, a client can choose to request content on smaller units than (Sub)segments.

The Tile Data Segments contain only the media data enclosed in specific media data boxes called IdentifiedMediaDataBoxes. The byte offsets contained in MovieFragmentBoxes are relative to the start of IdentifiedMediaDataBoxes. Thus, MovieFragmentBoxes and media data can reside in separate resources, unlike in conventional DASH segment formats.

As described above, a Tile Index Segment contains (sub) segment indexing for all tile streams, hence removing the need to fetch the index for each tile streams separately. It expects adding a new HTTP connection, but only one for the whole DASH stream. Similar to the first embodiment, in the second embodiment the player device may download foreground tiles as subsegments with byte range HTTP requests as needed, utilizing the 'sidx' information and/or MovieFragmentBoxes in tile index segments, and fetching background and other non-critical streams as full segments.

A third embodiment is based on segments with multiple durations. A server can create tile segments with multiple durations, which removes the need to fetch subsegment indices. Each duration can be a DASH representation of its own, and hence segment of each duration has a unique URL. Representations for tiles on background quality may have longer duration than representations for tiles on foreground quality. All representations may have the same video characteristics, e.g. random-access period (video GOP) to enable decoding them in parts, but they are only DASH packetized with different segment durations (1 GOP per DASH segment vs. e.g. 4 GOPs=4 subsegments per DASH segment). This may be trivial with RWMR schemes, since background tiles are in different adaptation sets than foreground tiles.— Therefore, the segment durations are different between adaptation sets, but constant between representations within an adaptation set. With multi-quality VD schemes, the same adaptation set may comprise representations with different segment durations. Furthermore, the background versus foreground division may be indicated within the MPD metadata for representations. Hence, the lowest quality representation (or perhaps a few lowest ones) may have longer DASH segments than others.

DASH @segmentAlignment requirement in OMAF (Annex B/HEVC VD profile definition), which requires that each segment has the same duration, may be relaxed.

Figure 6:
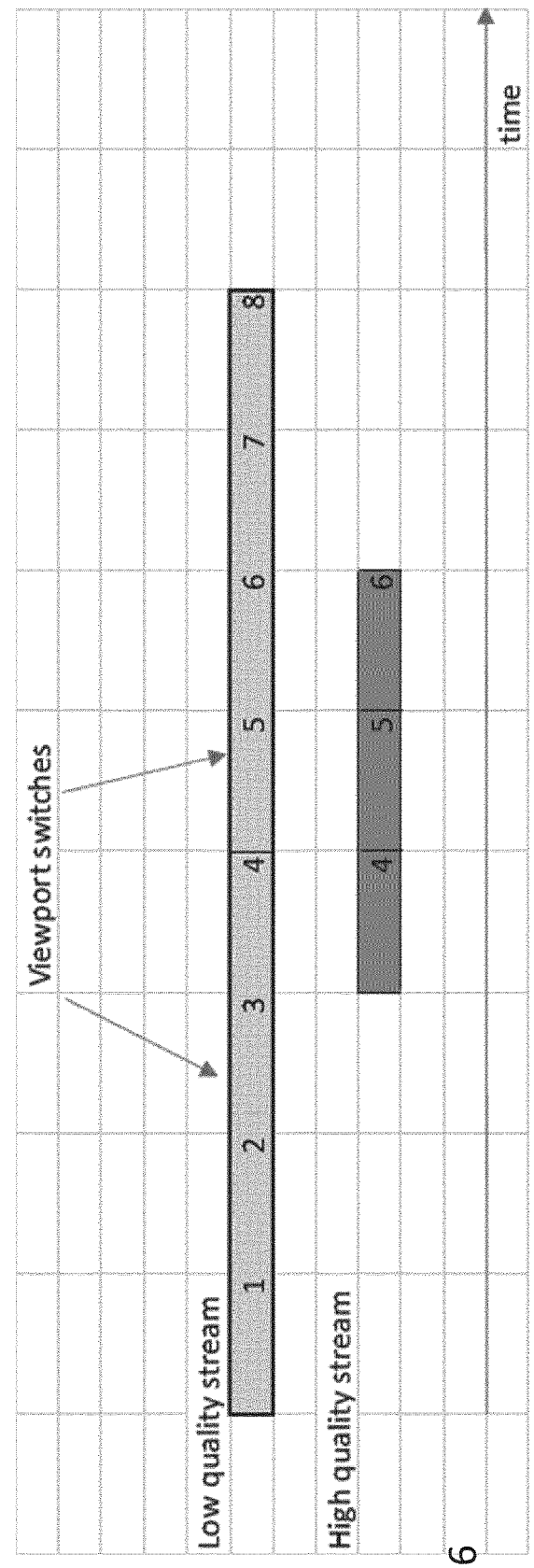
FIG. 6 shows a simplified illustration switching between low- and high-quality streams in DASH Live profile.

FIG. 6 illustrates the same case as in FIG. 5 with on-demand streams, where FIG. 6 shows live streams with 4 subsegments in 1 DASH segment, and the numbers corresponding to subsegments. The difference is that when switching back to low quality, the player needs to fetch the low-quality segment with subsegment 5, 6, 7, 8 to be able to switch to low quality at subsegment 7. This may be a small overhead, but it can be avoided with the second embodiment, where segment indices also for low quality streams are available with the single index segment stream that is anyway downloaded for high quality streams. Further, as subsegments 4 and 5 are from a different DASH segment, a player device needs to have the segment indices for them separately. In the first embodiment this would require 2 additional HTTP requests for this case. In the reference embodiment, a player device would fetch two full segments, total 8 subsegments, and would skip subsegments 1, 2, 3, and would show subsegments 4, 5, 6, 7, 8 in high quality. Further, since downloading the first high quality segment is started late, it may be so that it can't download the first high quality segment in time before subsegment 4 needs to be rendered. This is because downloading a large segment takes time, whereupon it can render high quality only at subsegment 5, which increases viewport switch latency.

Figure 7:
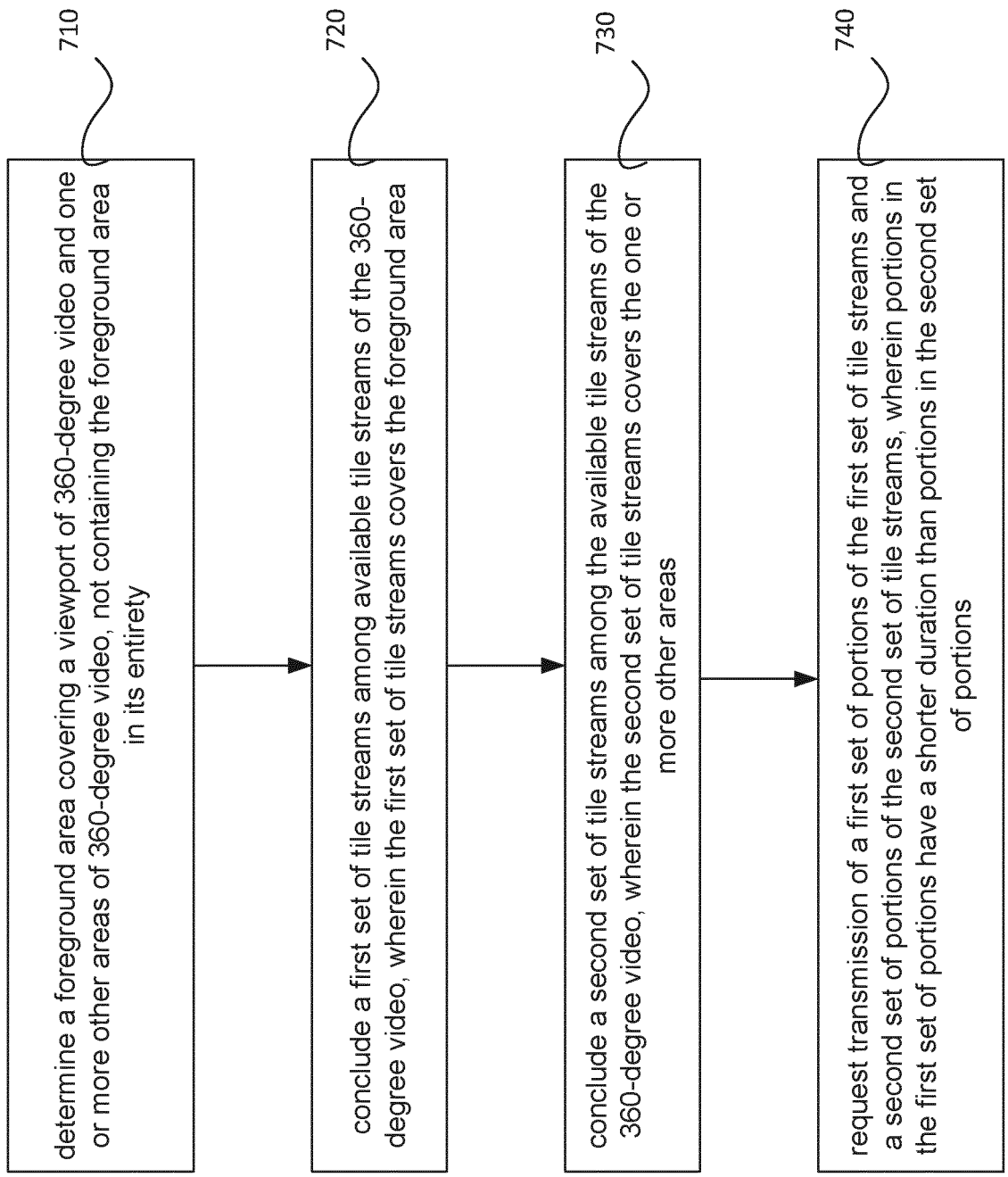
FIG. 7 is a flowchart illustrating a method according to an embodiment.

The method according to an embodiment is shown in FIG. 7. The method generally comprises determining a foreground area covering a viewport of 360-degree video and one or more other areas of 360-degree video, not containing the foreground area in its entirety; concluding a first set of tile streams among available tile streams of the 360-degree video, wherein the first set of tile streams covers the foreground area; concluding a second set of tile streams among the available tile streams of the 360-degree video, wherein the second set of tile streams covers the one or more other areas; requesting transmission of a first set of portions of the first set of tile streams and a second set of portions of the second set of tile streams, wherein portions in the first set of portions have a shorter duration than portions in the second set of portions. Each of the steps can be implemented by a respective module of a computer system.

An apparatus according to an embodiment comprises means for
  means for determining a foreground area covering a viewport of 360-degree video and one or more other areas of 360-degree video, not containing the foreground area in its entirety;
  means for concluding a first set of tile streams among available tile streams of the 360-degree video, wherein the first set of tile streams covers the foreground area;
  means for concluding a second set of tile streams among the available tile streams of the 360-degree video, wherein the second set of tile streams covers the one or more other areas;
  means for requesting transmission of a first set of portions of the first set of tile streams and a second set of portions of the second set of tile streams, wherein portions in the first set of portions have a shorter duration than portions in the second set of portions.

The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

Figure 8:
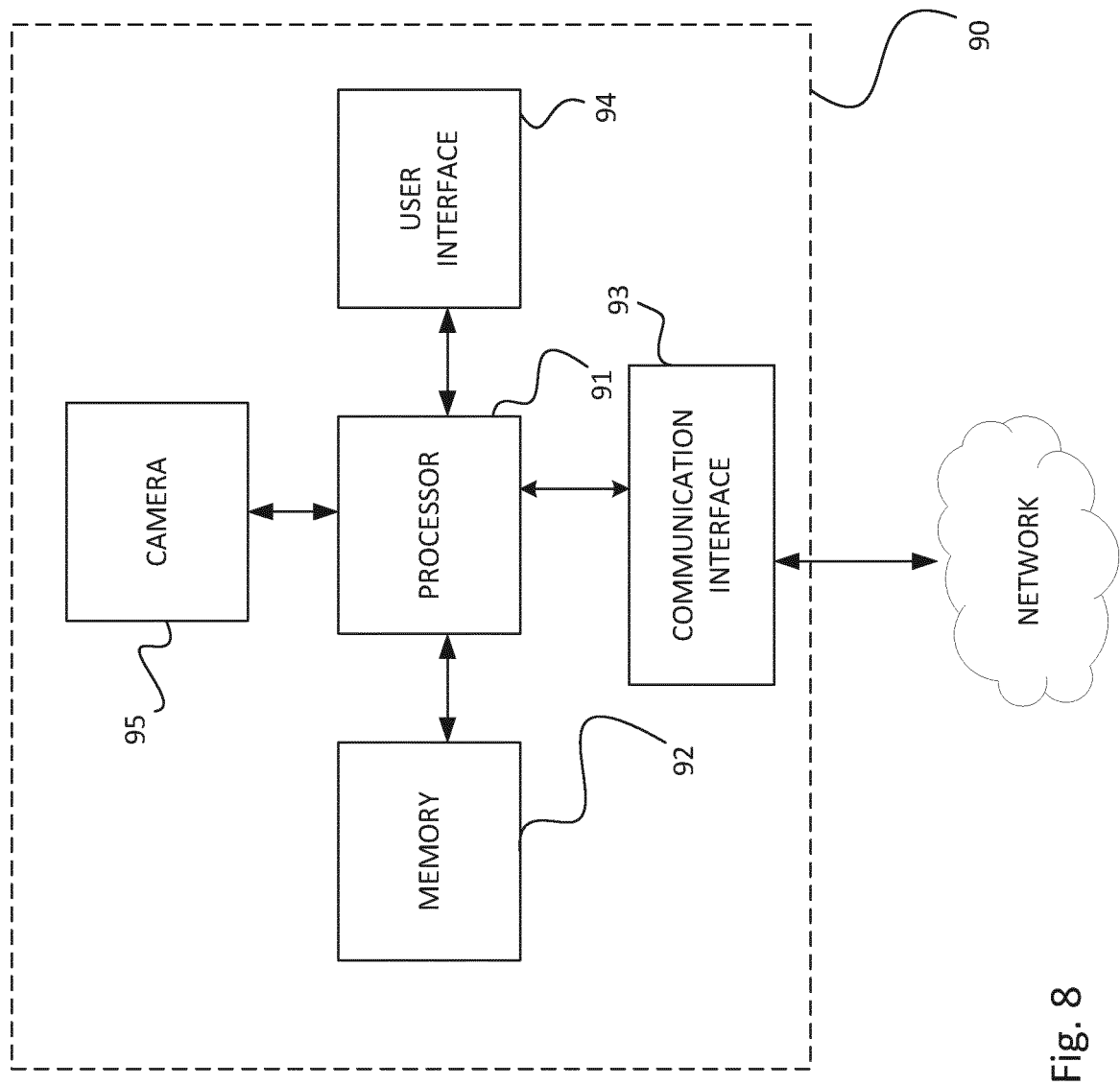
FIG. 8 shows an example of an apparatus according to an embodiment.

An example of an apparatus is shown in FIG. 8. Several functionalities can be carried out with a single physical device, e.g. in a single processor, if desired. The apparatus 90 comprises a main processing unit 91, a memory 92, a user interface 94, a communication interface 93. The apparatus according to an embodiment, shown in FIG. 8, also comprises a camera module 95. The memory 92 stores data including computer program code in the apparatus 90. The computer program code is configured to implement the method according to flowchart of FIG. 7. The camera module 95 receives input data, in the form of video stream, to be processed by the processor 91.

The communication interface 93 forwards processed data for example to a display of another device, such an HMD. When the apparatus 90 is a video source comprising the camera module 95, user inputs may be received from the user interface. If the apparatus 90 is a middlebox in a network, the user interface is optional, such as the camera module.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

A computer program product according to an embodiment can be embodied on a non-transitory computer readable medium. According to another embodiment, the computer program product can be downloaded over a network in a data packet.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   determining a foreground area covering a viewport of 360-degree video, and one or more other areas of the 360-degree video not containing the foreground area in its entirety;
   selecting a first set of tile streams among available tile streams of the 360-degree video, wherein the first set of tile streams covers the foreground area;
   selecting a second set of tile streams among the available tile streams of the 360-degree video, wherein the second set of tile streams covers the one or more other areas; and
   requesting transmission of a first set of portions of the first set of tile streams and a second set of portions of the second set of tile streams, wherein at least one of the first set of portions have a shorter duration than at least one portion of the second set of portions.

2. A method according to claim 1, wherein the one or more other areas comprises a margin area and a background area, and the method further comprises:
   determining the margin area adjacent to the foreground area, and the background area covering 360-degree video not contained in the foreground or margin areas;
   selecting a first subset of the second set of tile streams, wherein the first subset of tile streams covers the foreground area;
   selecting a second subset of the second set of tile streams, wherein the second subset of tile streams comprises tile streams that are among the second set of tile streams and not among the first subset of tile streams; and
   requesting transmission of a first subset of portions of the first subset of tile streams and a second subset of portions of the second subset of tile streams, wherein at least one of the first subset of portions of the first subset of tile streams have a shorter duration than at least one portion of the second subset of portions of the second subset of tile streams.

3. A method according to claim 1, further comprising requesting transmission of an extractor track in portions that have a longer duration than that for the at least one of the first set of portions.

4. A method according to claim 1, further comprising:
   obtaining, from a media presentation description and/or a stream initialization data and/or a stream index data, metadata on areas covered with the available tile streams; and
   selecting the first set of tile streams and the second set of tile streams based on the metadata.

5. An apparatus comprising:
   at least one processor; and
   at least one non-transitory memory including computer program code,
   the at least one memory and the computer program code configured to, with the at least one processor, cause the apparatus to perform at least:
   determine a foreground area covering a viewport of 360-degree video, and one or more other areas of the 360-degree video not containing the foreground area in its entirety;
   select a first set of tile streams among available tile streams of the 360-degree video, wherein the first set of tile streams covers the foreground area;
   select a second set of tile streams among the available tile streams of the 360-degree video, wherein the second set of tile streams covers the one or more other areas; and
   request transmission of a first set of portions of the first set of tile streams and a second set of portions of the second set of tile streams, wherein at least one of the first set of portions have a shorter duration than at least one portion of the second set of portions.

6. An apparatus according to claim 5, wherein the one or more other areas comprises a margin area and a background area, and the at least one memory and the computer program code are configured, with the at least one processor, to cause the apparatus to:
   determine the margin area adjacent to the foreground area, and a background area covering 360-degree video not contained in the foreground or margin areas;
   select a first subset of the second set of tile streams, wherein the first subset of tile streams covers the foreground area;
   select a second subset of the second set of tile streams, wherein the second subset of tile streams comprises tile streams that are among the second set of tile streams and not among the first subset of tile streams; and
   request transmission of a first subset of portions of the first subset of tile streams and a second subset of portions of the second subset of tile streams, wherein at least one of the first subset of portions of the first subset of tile streams have a shorter duration than at least one portion of the second subset of portions of the second subset of tile streams.

7. An apparatus according to claim 5, where the at least one memory and the computer program code are configured, with the at least one processor, to cause the apparatus to request transmission of an extractor track in portions that have a longer duration than that for the at least one of the first set of portions.

8. An apparatus according to claim 5, where the at least one memory and the computer program code are configured, with the at least one processor, to cause the apparatus to:
obtain, from a media presentation description and/or stream initialization data and/or stream index data, metadata on areas covered with the available tile streams; and
select the first set of tile streams and the second set of tile streams based on the metadata.

9. A computer program product comprising a non-transitory computer readable medium encoded with computer program code configured to, when executed on at least one processor, cause an apparatus or a system to:
determine a foreground area covering a viewport of 360-degree video, and one or more other areas of the 360-degree video not containing the foreground area in its entirety;
select a first set of tile streams among available tile streams of the 360-degree video, wherein the first set of tile streams covers the foreground area;
select a second set of tile streams among the available tile streams of the 360-degree video, wherein the second set of tile streams covers the one or more other areas; and
request transmission of a first set of portions of the first set of tile streams and a second set of portions of the second set of tile streams, wherein at least one of the first set of portions have a shorter duration than at least one portion of the second set of portions.

10. A computer program product according to claim 9, wherein the one or more other areas comprises a margin area and a background area, and the computer program product is configured to cause the apparatus or system to:
determine the margin area adjacent to the foreground area, and a background area covering 360-degree video not contained in the foreground or margin areas;
select a first subset of the second set of tile streams, wherein the first subset of tile streams covers the foreground area;
select a second subset of the second set of tile streams, wherein the second subset of tile streams comprises tile streams that are among the second set of tile streams and not among the first subset of tile streams; and
request transmission of a first subset of portions of the first subset of tile streams and a second subset of portions of the second subset of tile streams, wherein at least one of the first subset of portions of the first subset of tile streams have a shorter duration than at least one portion of the second subset of portions of the second subset of tile streams.

11. A computer program product according to claim 9, where the computer program code is configured to cause the apparatus to request transmission of an extractor track in portions that have a longer duration than that for the at least one of the first set of portions.

12. A computer program product according to claim 9, where the computer program code is configured to cause the apparatus to:
obtain, from a media presentation description and/or stream initialization data and/or stream index data, metadata on areas covered with the available tile streams; and
select the first set of tile streams and the second set of tile streams based on the metadata.

13. A computer program product according to claim 9, where the computer program code is configured to cause the apparatus to:
receive the first set of portions and the second set of portions; and
perform presentation of at least one of the first set of portions or the second set of portions.

14. An apparatus according to claim 5, wherein the at least one memory and the computer program code are configured, with the at least one processor, to cause the apparatus to:
receive the first set of portions and the second set of portions; and
perform presentation of at least one of the first set of portions or the second set of portions.

15. An apparatus according to claim 5, wherein a DASH client comprises the apparatus.

16. An apparatus according to claim 5, wherein transmission of the first subset of portions and the second subset of portions is requested from a server.

17. An apparatus according to claim 5, wherein the first set of portions of the first set of tile streams comprises at least one of: one or more first segments of the 360-degree video, or one or more first subsegments of the 360-degree video,
wherein the second set of portions of the second set of tile streams comprises at least one of: one or more second segments of the 360-degree video, or one or more second subsegments of the 360-degree video.

18. A method according to claim 1, further comprising:
receiving the first set of portions and the second set of portions; and
performing presentation of at least one of the first set of portions or the second set of portions.

19. A method according to claim 1, wherein transmission of the first subset of portions and the second subset of portions is requested from a server.

20. A method according to claim 1, wherein the first set of portions of the first set of tile streams comprises at least one of: one or more first segments of the 360-degree video, or one or more first subsegments of the 360-degree video,
wherein the second set of portions of the second set of tile streams comprises at least one of: one or more second segments of the 360-degree video, or one or more second subsegments of the 360-degree video.

* * * * *